(12) United States Patent
Chen et al.

(10) Patent No.: US 10,742,470 B2
(45) Date of Patent: Aug. 11, 2020

(54) DATA TRANSMISSION METHOD AND APPARATUS

(71) Applicant: ZTE CORPORATION, Shenzhen, Guangdong (CN)

(72) Inventors: Donglei Chen, Shenzhen (CN); Zhisong Zuo, Shenzhen (CN); Shuqiang Xia, Shenzhen (CN); Peng Hao, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 16/335,864

(22) PCT Filed: Sep. 13, 2017

(86) PCT No.: PCT/CN2017/101469
§ 371 (c)(1),
(2) Date: Jul. 11, 2019

(87) PCT Pub. No.: WO2018/054248
PCT Pub. Date: Mar. 29, 2018

(65) Prior Publication Data
US 2019/0334754 A1    Oct. 31, 2019

(30) Foreign Application Priority Data

Sep. 23, 2016 (CN) .......................... 2016 1 0846513

(51) Int. Cl.
*H04L 27/26* (2006.01)
*H04L 5/00* (2006.01)
*H04L 27/20* (2006.01)

(52) U.S. Cl.
CPC ........ *H04L 27/2678* (2013.01); *H04L 5/0007* (2013.01); *H04L 27/205* (2013.01);
(Continued)

(58) Field of Classification Search
None
See application file for complete search history.

(56) References Cited

U.S. PATENT DOCUMENTS

| 10,523,372 | B2 * | 12/2019 | Yang ............... H04W 76/27 |
| 2012/0236802 | A1 * | 9/2012 | Gong ............... H04L 5/0094 |
| | | | 370/329 |

(Continued)

FOREIGN PATENT DOCUMENTS

| CN | 105684474 A | * | 6/2016 | ............ H04W 48/16 |
| CN | 107872415 A | * | 4/2018 | ......... H04L 27/2646 |

OTHER PUBLICATIONS

International Search Report and Written Opinion for International Appl. No. PCT/CN2017/101469, dated Nov. 30, 2017.
(Continued)

*Primary Examiner* — Berhanu Tadese
(74) *Attorney, Agent, or Firm* — Foley & Lardner LLP

(57) ABSTRACT

Provided are a data transmission method and apparatus, a sending end sends data to a receiving end on one or more orthogonal frequency division multiplexing (OFDM) symbols in a scheduling unit, and the receiving end receives data sent by the sending end on one or more OFDM symbols in the scheduling unit. A time length of the scheduling unit is a length of two long term evolution (LTE) OFDM symbols having normal cycle prefixes and a subcarrier spacing of 15 kHz, the scheduling unit is formed by seven or eight OFDM symbols having a subcarrier spacing of 60 kHz, the scheduling unit is maintained to be the seven OFDM symbols having a subcarrier spacing of 60 kHz and having new extended cycle prefixes.

20 Claims, 4 Drawing Sheets

(52) U.S. Cl.
CPC ........ *H04L 27/262* (2013.01); *H04L 27/2646* (2013.01); *H04L 27/2662* (2013.01)

(56) References Cited

U.S. PATENT DOCUMENTS

| | | | | |
|---|---|---|---|---|
| 2012/0243496 | A1* | 9/2012 | Zhu | H04W 74/002 370/329 |
| 2012/0250563 | A1* | 10/2012 | Liu | H04W 40/12 370/252 |
| 2015/0341908 | A1* | 11/2015 | Wang | H04L 5/0053 370/312 |
| 2017/0094655 | A1* | 3/2017 | Dai | H04L 5/14 |
| 2018/0234213 | A1* | 8/2018 | Han | H04L 1/18 |
| 2018/0278396 | A1* | 9/2018 | Yang | H04L 27/2613 |
| 2018/0310282 | A1* | 10/2018 | Shi | H04W 72/042 |
| 2019/0045544 | A1* | 2/2019 | Wang | H04W 16/14 |
| 2019/0159148 | A1* | 5/2019 | Jung | H04J 11/0069 |
| 2019/0174449 | A1* | 6/2019 | Shan | H04W 60/04 |
| 2019/0215788 | A1* | 7/2019 | Zhang | H04L 27/26 |
| 2019/0253183 | A1* | 8/2019 | Hao | H04W 72/044 |
| 2019/0254026 | A1* | 8/2019 | Liu | H04L 5/0048 |
| 2019/0274154 | A1* | 9/2019 | Shi | H04L 5/0055 |
| 2019/0327041 | A1* | 10/2019 | Gou | H04W 72/04 |
| 2019/0334754 | A1* | 10/2019 | Chen | H04L 27/2662 |
| 2019/0342132 | A1* | 11/2019 | Kazmi | H04L 27/2602 |
| 2019/0349160 | A1* | 11/2019 | Gou | H04L 5/0007 |
| 2019/0349795 | A1* | 11/2019 | Park | H04W 72/1289 |
| 2019/0364520 | A1* | 11/2019 | Kazmi | H04W 56/002 |

OTHER PUBLICATIONS

Mediatek Inc., "On the alignment of OFDM symbol boundary," GPP TSG RAN WG1 Meeting #86, R1-167528, Gothenburg, Sweden, Aug. 22-26, 2016.

Qualcomm, et al. "WF on Scalable Numerology Symbol Boundary Alignment," 3GPP TSG RAN WG1 Meeting #85, R1-165583, Nanjing, China, May 23-27, 2016.

* cited by examiner

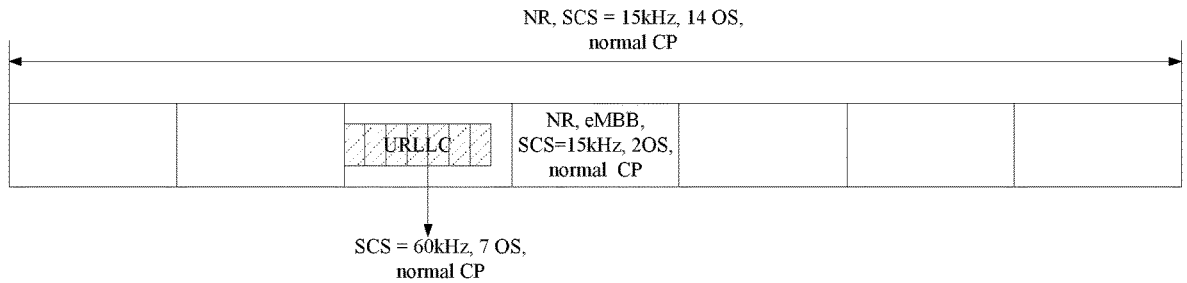
FIG. 1
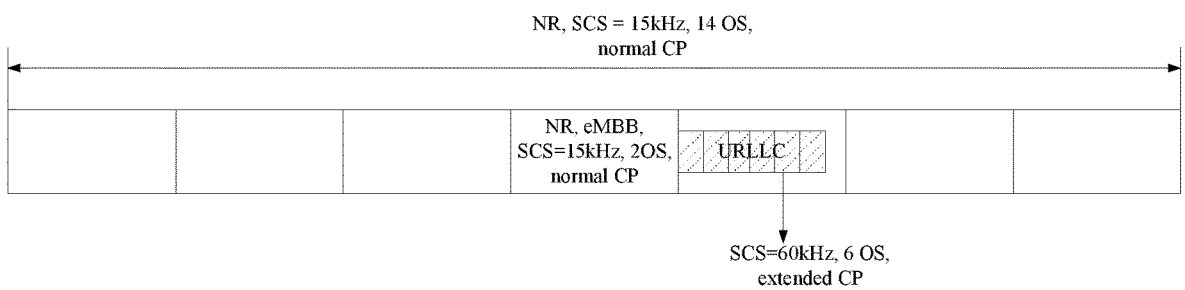
FIG. 2
Sending, by a sending end, data to a receiving end on one or more OFDM symbols in a scheduling unit
Receiving, by a receiving end, data sent by the sending end on one or more OFDM symbols in the scheduling unit
FIG. 3

DATA TRANSMISSION METHOD AND APPARATUS

CROSS REFERENCE TO RELATED APPLICATIONS

This is a National Stage Application, under 35 U.S.C. 371, of International Patent Application No. PCT/CN2017/101469, filed on Sep. 13, 2017, which claims priority to Chinese Patent Application No. 201610846513.3, filed on Sep. 23, 2016, contents of both of which are incorporated herein by reference in their entireties.

TECHNICAL FIELD

The present application relates to, but is not limited to, mobile communications and, in particular, relates to a data transmission method and apparatus.

BACKGROUND

In the RAN1#86 Conference of the Third Generation Partnership Project (3GPP), the proposal that, in the new radio (NR), multiple different cycle prefix (CP) lengths need to be supported for a specific subcarrier spacing has been passed. Especially for the subcarrier spacing of 60 kHz, at least one CP which is similar to a long term evolution (LTE) normal CP needs to be supported, and a longer CP length may be required to support a bigger coverage range or a deployment scenario with a bigger latency expansion. A manner for obtaining the longer CP length is to scale an LTE-based extended CP down. In the LTE, an extended CP length is 512×Ts, where a length of the Ts is $1/30720$ ms. For the subcarrier spacing of 60 kHz, the CP length after scaled down becomes 512×Ts1, where a length of the Ts1 is $1/122880$ ms. For an orthogonal frequency division multiplexing (OFDM) symbol having the subcarrier spacing of 15 kHz, a time length of its valid data is 2048×Ts, that is, $1/15$ ms. For an OFDM symbol having the subcarrier spacing of 60 kHz, a time length of its valid data is 2048×Ts1, that is, $1/60$ ms. In the evolution of the LTE for a short transmission time interval (sTTI), two OFDM symbols having a subcarrier spacing (SCS) of 15 kHz and having normal CPs are supported to be one sTTI. In the NR, if a scheduling unit for the subcarrier spacing of 60 kHz can be aligned with the two 15 kHz OFDM symbols having normal CPs, there will be a possibility to better support the coexistence with the NR in the LTE subsequently. In addition, as shown in FIG. 1, for the OFDM symbol (OS) having the SCS of 60 kHz, its normal CP length is obtained by scaling the LTE normal CP down by four times. If seven symbols are used as the scheduling unit currently, the case where a boundary of the scheduling unit is not aligned with a boundary of the two 15 kHz OFDM symbols having normal CPs will exist. Considering that the symbol having the SCS of 60 kHz is mainly used in the ultra-reliable and low-latency communications (URLLC) service, when the URLLC service performs one transmission for a puncturing of an NR enhanced mobile Internet (eMBB) service and assuming that this transmission succeeds, one OFDM symbol having the SCS of 60 kHz existing between the seven OFDM symbols having the SCS of 60 kHz and the two OFDM symbols having the SCS of 15 kHz and having normal CPs is wasted.

When the URLLC service uses the SCS of 60 kHz, in order to support bigger coverage or deployment in the scenario having a bigger latency expansion, an extended CP is introduced. The extended CP is obtained by scaling the LTE-based extended CP down by four times. In this case, if the scheduling unit uses six OFDM symbols having the SCS of 60 kHz and having extended CPs, as shown in FIG. 2, the case where the boundary of the scheduling unit is not aligned with the boundary of the two 15 kHz OFDM symbols will exist. For the URLLC service, the eMBB service using the symbol having the SCS of 15 kHz is punctured. Assuming that the URLLC service performs one transmission and that this transmission succeeds, time less than a length of one OFDM symbol having the SCS of 60 kHz and having extended CPs between the six OFDM symbols having the SCS of 60 kHz and the OFDM symbol having the SCS of 15 kHz and having normal CPs is wasted.

SUMMARY

A summary of the subject matter is described hereinafter in detail. This summary is not intended to limit the scope of the claims.

Embodiments of the present application provide a data transmission method and apparatus. When a scheduling unit of an ultra-reliable and low-latency communications (URLLC) service having a subcarrier spacing of 60 kHz coexists with an orthogonal frequency division multiplexing (OFDM) symbol having a subcarrier spacing of 15 kHz, resource waste is reduced.

By introducing a new type of extended cycle prefixes (CPs) into an OFDM symbol having a subcarrier spacing of 60 kHz, the problem that, for the OFDM symbol having a subcarrier spacing of 60 kHz, a deployment scenario is limited if a CP length uses ¼ length of a long term evolution (LTE) normal CP may be effectively solved.

In a first aspect, the embodiments of the present application provide a data transmission method.

The method includes: sending, by a sending end, data to a receiving end on one or more OFDM symbols in a scheduling unit, where a time length of the scheduling unit is a length of two LTE OFDM symbols having normal CPs and a subcarrier spacing of 15 kHz, the scheduling unit is formed by seven or eight OFDM symbols having a subcarrier spacing of 60 kHz, or the scheduling unit is formed by a first gap and seven OFDM symbols having a subcarrier spacing of 60 kHz, or the scheduling unit is formed by a second gap and eight OFDM symbols having a subcarrier spacing of 60 kHz, the OFDM symbols having a subcarrier spacing of 60 kHz include CPs and valid data, two types of different CP lengths are used in the seven OFDM symbols having a subcarrier spacing of 60 kHz and the eight OFDM symbols having a subcarrier spacing of 60 kHz in the scheduling unit, a duration of the first gap is less than or equal to a first predetermined duration, and a duration of the second gap is less than or equal to a second predetermined duration.

In a second aspect, the embodiments of the present application further provide a data transmission method. The method includes: receiving, by a receiving end, data sent by a sending end on one or more OFDM symbols in a scheduling unit, where a time length of the scheduling unit is a length of two LTE OFDM symbols having normal CPs and a subcarrier spacing of 15 kHz, the scheduling unit is formed by seven or eight OFDM symbols having a subcarrier spacing of 60 kHz, or the scheduling unit is formed by a first gap and seven OFDM symbols having a subcarrier spacing of 60 kHz, or the scheduling unit is formed by a second gap and eight OFDM symbols having a subcarrier spacing of 60 kHz, the OFDM symbols having a subcarrier spacing of 60 kHz include CPs and valid data, two types of different CP lengths are used in the seven OFDM symbols having a subcarrier spacing of 60 kHz and the eight OFDM symbols having a subcarrier spacing of 60 kHz in the scheduling unit, a duration of the first gap is less than or equal to a first predetermined duration, and a duration of the second gap is less than or equal to a second predetermined duration.

In a third aspect, the embodiments of the present application further provide a data transmission apparatus. The apparatus includes: a sending unit, which is configured to send data to a receiving end on one or more OFDM symbols in a scheduling unit, where a time length of the scheduling unit is a length of two LTE OFDM symbols having normal CPs and a subcarrier spacing of 15 kHz, the scheduling unit is formed by seven or eight OFDM symbols having a subcarrier spacing of 60 kHz, or the scheduling unit is formed by a first gap and seven OFDM symbols having a subcarrier spacing of 60 kHz, or the scheduling unit is formed by a second gap and eight OFDM symbols having a subcarrier spacing of 60 kHz, the OFDM symbols having a subcarrier spacing of 60 kHz include CPs and valid data, two types of different CP lengths are used in the seven OFDM symbols having a subcarrier spacing of 60 kHz and the eight OFDM symbols having a subcarrier spacing of 60 kHz in the scheduling unit, a duration of the first gap is less than or equal to a first predetermined duration, and a duration of the second gap is less than or equal to a second predetermined duration.

In a fourth aspect, the embodiments of the present application further provide a data transmission apparatus. The apparatus includes: a receiving unit, which is configured to receive data sent by a sending end on one or more OFDM symbols in a scheduling unit, where a time length of the scheduling unit is a length of two LTE OFDM symbols having normal CPs and a subcarrier spacing of 15 kHz, the scheduling unit is formed by seven or eight OFDM symbols having a subcarrier spacing of 60 kHz, or the scheduling unit is formed by a first gap and seven OFDM symbols having a subcarrier spacing of 60 kHz, or the scheduling unit is formed by a second gap and eight OFDM symbols having a subcarrier spacing of 60 kHz, the OFDM symbols having a subcarrier spacing of 60 kHz include CPs and valid data, two types of different CP lengths are used in the seven OFDM symbols having a subcarrier spacing of 60 kHz and the eight OFDM symbols having a subcarrier spacing of 60 kHz in the scheduling unit, a duration of the first gap is less than or equal to a first predetermined duration, and a duration of the second gap is less than or equal to a second predetermined duration.

The embodiments of the present application further provide a computer-readable storage medium configured to store computer-executable instructions for executing the data transmission method in the first aspect when executed by a processor.

The embodiments of the present application further provide a computer-readable storage medium configured to store computer-executable instructions for executing the data transmission method in the second aspect when executed by a processor.

Through, the embodiments of the present application, the scheduling unit formed by eight OFDM symbols having a subcarrier spacing of 60 kHz and having normal CPs can be effectively aligned with the scheduling unit formed by seven OFDM symbols having a subcarrier spacing of 60 kHz and having new extended CPs. Since the time length is a length of two LTE OFDM symbols having a subcarrier spacing of 15 kHz and having normal CPs, this scheduling unit can be aligned with a boundary of two LTE OFDM symbols having a subcarrier spacing of 15 kHz and having normal CPs, thereby providing a possibility to simultaneously support an LTE short transmission time interval (TTI) and the new radio (NR) URLLC on the same carrier in the LTE evolution. In addition, in a case where a length of the scheduling unit is aligned with a length of two LTE OFDM symbols having a subcarrier spacing of 15 kHz and having normal CPs, the scheduling unit is maintained to be the seven OFDM symbols having a subcarrier spacing of 60 kHz and having new extended CPs, and it is convenient to reuse a design that the scheduling unit is the seven OFDM symbols having a subcarrier spacing of 15 kHz and having normal CPs in the frame structure design. What's more, in a case where the length of the scheduling unit is aligned with the length of the two LTE OFDM symbols having a subcarrier spacing of 15 kHz and having normal CPs, the resource waste caused when the scheduling unit is formed by seven OFDM symbols having a subcarrier spacing of 60 kHz and having normal CPs or caused when the scheduling unit is formed by six OFDM symbols having a subcarrier spacing of 60 kHz and having extended CPs can be reduced.

Other features and advantages of the present application will be elaborated hereinafter in the description and, moreover, partially become apparent from the description, or will be understood through implementation of the present application. The object and other advantages of the present application may be implemented and obtained through structures set forth in the description, claims and drawings.

BRIEF DESCRIPTION OF DRAWINGS

FIG. 1 is a schematic diagram illustrating that a scheduling unit is formed by seven OFDM symbols having a subcarrier spacing of 60 kHz and having normal CPs and that OFDM symbols having a subcarrier spacing of 15 kHz and having normal CPs coexist;

FIG. 2 is a schematic diagram illustrating that a scheduling unit is formed by six OFDM symbols having a subcarrier spacing of 60 kHz and having extended CPs and that OFDM symbols having a subcarrier spacing of 15 kHz and having normal CPs coexist;

FIG. 3 is a flowchart of a data transmission method according to an embodiment of the present application;

DETAILED DESCRIPTION

Figure 4:
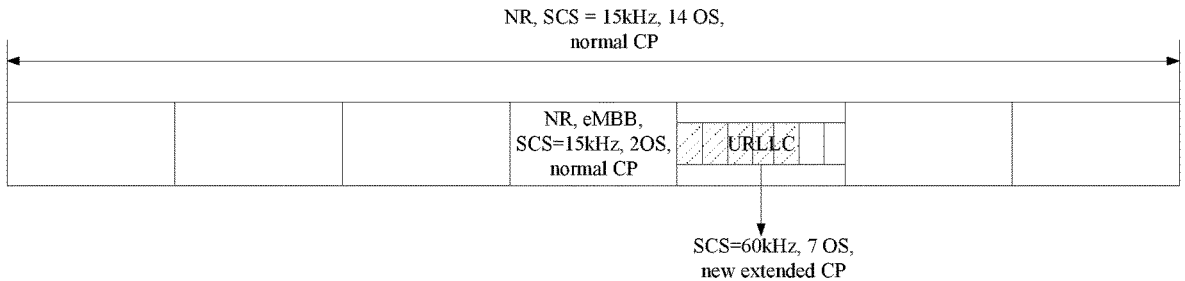
FIG. 4 is a schematic diagram illustrating that a scheduling unit is formed by seven OFDM symbols having a subcarrier spacing of 60 kHz and having new extended CPs and that OFDM symbols having a subcarrier spacing of 15 kHz and having normal CPs coexist in an embodiment of the present application.

Embodiments of the present application will be described below in detail with reference to the drawings. It is to be noted that if not in collision, the embodiments and features therein in the present application may be combined with each other.

The steps shown in the flowcharts in the drawings may be performed by a computer system such as a group of computers capable of executing instructions. Although logical sequences are shown in the flowcharts, the shown or described steps may be performed in sequences different from the sequences described herein in some cases.

As shown in FIG. 3, embodiments of the present application provide a data transmission method. The method includes steps described below.

A sending end sends data to a receiving end on one or more orthogonal frequency division multiplexing (OFDM) symbols in a scheduling unit, where a time length of the scheduling unit is a length of two long term evolution (LTE) OFDM symbols having normal cycle prefixes (CPs) and a subcarrier spacing of 15 kHz, the scheduling unit is formed by seven or eight OFDM symbols having a subcarrier spacing of 60 kHz, or the scheduling unit is formed by a first gap and seven OFDM symbols having a subcarrier spacing of 60 kHz, or the scheduling unit is formed by a second gap and eight OFDM symbols having a subcarrier spacing of 60 kHz, the OFDM symbols having a subcarrier spacing of 60 kHz include CPs and valid data, two types of different CP lengths are used in the seven OFDM symbols having a subcarrier spacing of 60 kHz and the eight OFDM symbols having a subcarrier spacing of 60 kHz in the scheduling unit, a duration of the first gap is less than or equal to a first predetermined duration, and a duration of the second gap is less than or equal to a second predetermined duration.

The receiving end receives the data on the one or more OFDM symbols in the scheduling unit.

Exemplarily, the first predetermined duration may be equal to $128 \times Ts1$, and the second predetermined duration may be equal to $64 \times Ts1$, where a length of the Ts1 is $1/122880$ ms.

It should be noted that it is known from related standards that in a short transmission time interval (TTI), the length of the two 15 kHz LTE OFDM symbols having normal CPs may be $2 \times 2192 \times Ts$, or may be $(2192+2208) \times Ts$, where the length of the Ts is $1/30720$ ms.

In this embodiment, in condition that the scheduling unit is formed by seven OFDM symbols having a subcarrier spacing of 60 kHz, the length of the two LTE OFDM symbols having normal CPs and a subcarrier spacing of 15 kHz is $2 \times 2192 \times Ts$, and configuration of CP lengths of the seven OFDM symbols having a subcarrier spacing of 60 kHz may include one of:

$512 \times Ts1$, $448 \times Ts1$, $448 \times Ts1$, $448 \times Ts1$, $448 \times Ts1$, $448 \times Ts1$, and $448 \times Ts1$;

$480 \times Ts1$, $480 \times Ts1$, $448 \times Ts1$, $448 \times Ts1$, $448 \times Ts1$, $448 \times Ts1$, and $448 \times Ts1$; and $464 \times Ts1$, $464 \times Ts1$, $464 \times Ts1$, $464 \times Ts1$, $448 \times Ts1$, $448 \times Ts1$, and $448 \times Ts1$;

where a length of the Ts is $1/30720$ ms, and a length of the Ts1 is $1/122880$ ms.

On the basis of configuration described above, the length of the two LTE OFDM symbols having normal CPs and a subcarrier spacing of 15 kHz is $2 \times 2192 \times Ts$, and the total length of the seven OFDM symbols having a subcarrier spacing of 60 kHz is $17536 \times Ts1$, which is exactly the same as the length of the two LTE OFDM symbols having normal CPs and a subcarrier spacing of 15 kHz of $2 \times 2192 \times Ts$. Therefore, when start positions are the same, the boundary alignment is guaranteed.

In this embodiment, in condition that the scheduling unit is formed by a first gap and seven OFDM symbols having a subcarrier spacing of 60 kHz, the length of the two LTE OFDM symbols having normal CPs and a subcarrier spacing of 15 kHz is $2 \times 2192 \times Ts$, and CP lengths of the seven OFDM symbols having a subcarrier spacing of 60 kHz respectively are:

$448 \times Ts1$, $448 \times Ts1$, $448 \times Ts1$, $448 \times Ts1$, $448 \times Ts1$, $448 \times Ts1$, and $448 \times Ts1$, remaining $64 \times Ts1$ obtained by removing a length of the seven OFDM symbols having a subcarrier spacing of 60 kHz from the time length of the scheduling unit is disposed is disposed before or after all symbols in the scheduling unit, and no information is sent or received in the remaining $64 \times Ts1$;

where a length of the Ts is $1/30720$ ms, and a length of the Ts1 is $1/122880$ ms.

At this time, a duration of the first gap is $64 \times Ts1$. On the basis of configuration described above, the length of the two LTE OFDM symbols having normal CPs and a subcarrier spacing of 15 kHz is $2 \times 2192 \times Ts$, and a sum of the total length of the seven OFDM symbols having a subcarrier spacing of 60 kHz and the remaining $64 \times Ts1$ in which no information is sent or received is $17536 \times Ts1$, which is exactly the same as the length of the two LTE OFDM symbols having normal CPs and a subcarrier spacing of 15 kHz of $2 \times 2192 \times Ts$. Therefore, when start positions are the same, the boundary alignment is guaranteed. In this embodiment, in condition that the scheduling unit is formed by seven OFDM symbols having a subcarrier spacing of 60 kHz, the length of the two LTE OFDM symbols having normal CPs and a subcarrier spacing of 15 kHz is $(2192+2208) \times Ts$, and configuration of CP lengths of the seven OFDM symbols having a subcarrier spacing of 60 kHz may include one of:

$576 \times Ts1$, $448 \times Ts1$, $448 \times Ts1$, $448 \times Ts1$, $448 \times Ts1$, $448 \times Ts1$, and $448 \times Ts1$;

$512 \times Ts1$, $512 \times Ts1$, $448 \times Ts1$, $448 \times Ts1$, $448 \times Ts1$, $448 \times Ts1$, and $448 \times Ts1$;

480×Ts1, 480×Ts1, 480×Ts1, 480×Ts1, 448×Ts1, 448×Ts1, and 448×Ts1; and
480×Ts1, 464×Ts1, 464×Ts1, 464×Ts1, 464×Ts1, 464×Ts1, and 464×Ts1;
where a length of the Ts is $1/30720$ ms, and a length of the Ts1 is $1/122880$ ms.

On the basis of configuration described above, the length of the two LTE OFDM symbols having normal CPs and a subcarrier spacing of 15 kHz is (2192+2208)×Ts, and the total length of the seven OFDM symbols having a subcarrier spacing of 60 kHz is 17600×Ts1, which is exactly the same as the length of the two LTE OFDM symbols having normal CPs and a subcarrier spacing of 15 kHz of (2192+2208)×Ts. Therefore, when start positions are the same, the boundary alignment is guaranteed.

In this embodiment, in condition that the scheduling unit is formed by a first gap and seven OFDM symbols having a subcarrier spacing of 60 kHz, the length of the two LTE OFDM symbols having normal CPs and a subcarrier spacing of 15 kHz is (2192+2208)×Ts, and CP lengths of the seven OFDM symbols having a subcarrier spacing of 60 kHz include one of: 448×Ts1, 448×Ts1, 448×Ts1, 448×Ts1, 448×Ts1, 448×Ts1, and 448×Ts1, remaining 128×Ts1 obtained by removing a length of the seven OFDM symbols having a subcarrier spacing of 60 kHz from the time length of the scheduling unit is disposed before or after all symbols in the scheduling unit, and no information is sent or received in the remaining 128×Ts1; or
464×Ts1, 464×Ts1, 464×Ts1, 464×Ts1, 464×Ts1, 464×Ts1, and 464×Ts1, remaining 16×Ts1 obtained by removing a length of the seven OFDM symbols having a subcarrier spacing of 60 kHz from the time length of the scheduling unit is disposed before or after all symbols in the scheduling unit, and no information is sent or received in the remaining 16×Ts1; where a length of the Ts is $1/30720$ ms, and a length of the Ts1 is $1/122880$ ms.

On the basis of configuration described above, a duration of the first gap may be 128×Ts1 or 16×Ts1. The length of the two LTE OFDM symbols having normal CPs and a subcarrier spacing of 15 kHz is (2192+2208)×Ts, and a sum of the total length of the seven OFDM symbols having a subcarrier spacing of 60 kHz and the remaining 128×Ts1 or the remaining 16×Ts1 in which no information is sent or received is 17600×Ts1, which is exactly the same as the length of the two LTE OFDM symbols having normal CPs and a subcarrier spacing of 15 kHz of (2192+2208)×Ts. Therefore, when start positions are the same, the boundary alignment is guaranteed.

In this embodiment, in condition that the scheduling unit is formed by eight OFDM symbols having a subcarrier spacing of 60 kHz, the length of the two LTE OFDM symbols having normal CPs and a subcarrier spacing of 15 kHz is 2×2192×Ts, and CP lengths of the eight OFDM symbols having a subcarrier spacing of 60 kHz respectively are: 144×Ts1, 144×Ts1, 144×Ts1, 144×Ts1, 144×Ts1, 144×Ts1, 144×Ts1, and 144×Ts1, where a length of the Ts is $1/30720$ ms, and a length of the Ts1 is $1/122880$ ms.

On the basis of configuration described above, the length of the two LTE OFDM symbols having normal CPs and a subcarrier spacing of 15 kHz is 2×2192×Ts, and the total length of the eight OFDM symbols having a subcarrier spacing of 60 kHz is 17536×Ts1, which is exactly the same as the length of the two LTE OFDM symbols having normal CPs and a subcarrier spacing of 15 kHz of 2×2192×Ts. Therefore, when start positions are the same, the boundary alignment is guaranteed.

In this embodiment, in condition that the scheduling unit is formed by eight OFDM symbols having a subcarrier spacing of 60 kHz, the length of the two LTE OFDM symbols having normal CPs and a subcarrier spacing of 15 kHz is (2192+2208)×Ts, and configuration CP lengths of the eight OFDM symbols having a subcarrier spacing of 60 kHz may include one of:
160×Ts1, 160×Ts1, 160×Ts1, 160×Ts1, 144×Ts1, 144×Ts1, 144×Ts1, and 144×Ts1; and
208×Ts1, 144×Ts1, 144×Ts1, 144×Ts1, 144×Ts1, 144×Ts1, 144×Ts1, and 144×Ts1;
where a length of the Ts is $1/30720$ ms, and a length of the Ts1 is $1/122880$ ms.

On the basis of configuration described above, the length of the two LTE OFDM symbols having normal CPs and a subcarrier spacing of 15 kHz is (2192+2208)×Ts, and the total length of the eight OFDM symbols having a subcarrier spacing of 60 kHz is 17600×Ts1, which is exactly the same as the length of the two 15 kHz LTE OFDM symbols having normal CPs of (2192+2208)×Ts. Therefore, when start positions are the same, the boundary alignment is guaranteed.

In this embodiment, in condition that the scheduling unit is formed by a second gap and eight OFDM symbols having a subcarrier spacing of 60 kHz, the length of the two LTE OFDM symbols having normal CPs and a subcarrier spacing of 15 kHz is (2192+2208)×Ts, and CP lengths of the eight OFDM symbols having a subcarrier spacing of 60 kHz respectively are:
144×Ts1, 144×Ts1, 144×Ts1, 144×Ts1, 144×Ts1, 144×Ts1, 144×Ts1, and 144×Ts1, remaining 64×Ts1 obtained by removing a length of the eight OFDM symbols having a subcarrier spacing of 60 kHz from the time length of the scheduling unit is disposed before or after all symbols in the scheduling unit, and no information is sent or received in the remaining 64×Ts1;
where a length of the Ts is $1/30720$ ms, and a length of the Ts1 is $1/122880$ ms.

On the basis of configuration described above, a duration of the second gap is 64×Ts1. The length of the two LTE OFDM symbols having normal CPs and a subcarrier spacing of 15 kHz is (2192+2208)×Ts, and a sum of the total length of the eight OFDM symbols having a subcarrier spacing of 60 kHz and the remaining 64×Ts1 in which no information is sent or received is 17600×Ts1, which is exactly the same as the length of the two LTE OFDM symbols having normal CPs and a subcarrier spacing of 15 kHz of (2192+2208)×Ts. Therefore, when start positions are the same, the boundary alignment is guaranteed.

The embodiments of the present application further provide a data transmission method. The method includes a step described below.

A receiving end receives data sent by a sending end on one or more OFDM symbols in a scheduling unit, where a time length of the scheduling unit is a length of two LTE OFDM symbols having normal CPs and a subcarrier spacing of 15 kHz, the scheduling unit is formed by seven or eight OFDM symbols having a subcarrier spacing of 60 kHz, or the scheduling unit is formed by a first gap and seven OFDM symbols having a subcarrier spacing of 60 kHz, or the scheduling unit is formed by a second gap and eight OFDM symbols having a subcarrier spacing of 60 kHz, the OFDM symbols having a subcarrier spacing of 60 kHz include CPs and valid data, two types of different CP lengths are used in the seven OFDM symbols having a subcarrier spacing of 60 kHz and the eight OFDM symbols having a subcarrier spacing of 60 kHz in the scheduling unit, a duration of the first gap is less than or equal to a first predetermined duration, and a duration of the second gap is less than or equal to a second predetermined duration.

Exemplarily, the first predetermined duration may be equal to 128×Ts1, and the second predetermined duration may be equal to 64×Ts1, where a length of the Ts1 is $1/122880$ ms.

In condition that the scheduling unit is formed by seven OFDM symbols having a subcarrier spacing of 60 kHz, the length of the two LTE OFDM symbols having normal CPs and a subcarrier spacing of 15 kHz is 2×2192×Ts, and configuration of CP lengths of the seven OFDM symbols having a subcarrier spacing of 60 kHz include one of:
512×Ts1, 448×Ts1, 448×Ts1, 448×Ts1, 448×Ts1, 448×Ts1, and 448×Ts1;
480×Ts1, 480×Ts1, 448×Ts1, 448×Ts1, 448×Ts1, 448×Ts1, and 448×Ts1; and
464×Ts1, 464×Ts1, 464×Ts1, 464×Ts1, 448×Ts1, 448×Ts1, and 448×Ts1;
where a length of the Ts is $1/30720$ ms, and a length of the Ts1 is $1/122880$ ms.

In condition that the scheduling unit is formed by a first gap and seven OFDM symbols having a subcarrier spacing of 60 kHz, the length of the two LTE OFDM symbols having normal CPs and a subcarrier spacing of 15 kHz is 2×2192×Ts, and CP lengths of the seven OFDM symbols having a subcarrier spacing of 60 kHz respectively are:
448×Ts1, 448×Ts1, 448×Ts1, 448×Ts1, 448×Ts1, 448×Ts1, and 448×Ts1, remaining 64×Ts1 obtained by removing a length of the seven OFDM symbols having a subcarrier spacing of 60 kHz from the time length of the scheduling unit is disposed before or after all symbols in the scheduling unit, and no information is sent or received in the remaining 64×Ts1; where a length of the Ts is $1/30720$ ms, and a length of the Ts1 is $1/122880$ ms.

In condition that the scheduling unit is formed by seven OFDM symbols having a subcarrier spacing of 60 kHz, the length of the two LTE OFDM symbols having normal CPs and a subcarrier spacing of 15 kHz is (2192+2208)×Ts, and CP lengths of the seven OFDM symbols having a subcarrier spacing of 60 kHz includes one of:
576×Ts1, 448×Ts1, 448×Ts1, 448×Ts1, 448×Ts1, 448×Ts1, and 448×Ts1;
512×Ts1, 512×Ts1, 448×Ts1, 448×Ts1, 448×Ts1, 448×Ts1, and 448×Ts1;
480×Ts1, 480×Ts1, 480×Ts1, 480×Ts1, 448×Ts1, 448×Ts1, and 448×Ts1; and
480×Ts1, 464×Ts1, 464×Ts1, 464×Ts1, 464×Ts1, 464×Ts1, and 464×Ts1;
where a length of the Ts is $1/30720$ ms, and a length of the Ts1 is $1/122880$ ms.

In condition that the scheduling unit is formed by a first gap and seven OFDM symbols having a subcarrier spacing of 60 kHz, the length of the two LTE OFDM symbols having normal CPs and a subcarrier spacing of 15 kHz is (2192+2208)×Ts, and configuration of CP lengths of the seven OFDM symbols having a subcarrier spacing of 60 kHz include one of:
448×Ts1, 448×Ts1, 448×Ts1, 448×Ts1, 448×Ts1, 448×Ts1, and 448×Ts1, remaining 128×Ts1 obtained by removing a length of the seven OFDM symbols having a subcarrier spacing of 60 kHz from the time length of the scheduling unit is disposed before or after all symbols in the scheduling unit, and no information is sent or received in the remaining 128×Ts1; and
464×Ts1, 464×Ts1, 464×Ts1, 464×Ts1, 464×Ts1, 464×Ts1, and 464×Ts1, remaining 16×Ts1 obtained by removing a length of the seven OFDM symbols having a subcarrier spacing of 60 kHz from the time length of the scheduling unit is disposed before or after all symbols in the scheduling unit, and no information is sent or received in the remaining 16×Ts1;
where a length of the Ts is $1/30720$ ms, and a length of the Ts1 is $1/122880$ ms.

In condition that the scheduling unit is formed by eight OFDM symbols having a subcarrier spacing of 60 kHz, the length of the two LTE OFDM symbols having normal CPs and a subcarrier spacing of 15 kHz is 2×2192×Ts, and CP lengths of the eight OFDM symbols having a subcarrier spacing of 60 kHz respectively are: 144×Ts1, 144×Ts1, 144×Ts1, 144×Ts1, 144×Ts1, 144×Ts1, 144×Ts1, and 144×Ts1, where a length of the Ts is $1/30720$ ms, and a length of the Ts1 is $1/122880$ ms.

In condition that the scheduling unit is formed by eight OFDM symbols having a subcarrier spacing of 60 kHz, the length of the two LTE OFDM symbols having normal CPs and a subcarrier spacing of 15 kHz is (2192+2208)×Ts, and configuration of CP lengths of the eight OFDM symbols having a subcarrier spacing of 60 kHz includes one of:
160×Ts1, 160×Ts1, 160×Ts1, 160×Ts1, 144×Ts1, 144×Ts1, 144×Ts1, and 144×Ts1; or
208×Ts1, 144×Ts1, 144×Ts1, 144×Ts1, 144×Ts1, 144×Ts1, 144×Ts1, and 144×Ts1;
where a length of the Ts is $1/30720$ ms, and a length of the Ts1 is $1/122880$ ms.

In condition that the scheduling unit is formed by a second gap and eight OFDM symbols having a subcarrier spacing of 60 kHz, the length of the two LTE OFDM symbols having normal CPs and a subcarrier spacing of 15 kHz is (2192+2208)×Ts, and CP lengths of the eight OFDM symbols having a subcarrier spacing of 60 kHz respectively are:
144×Ts1, 144×Ts1, 144×Ts1, 144×Ts1, 144×Ts1, 144×Ts1, 144×Ts1, and 144×Ts1, remaining 64×Ts1 obtained by removing a length of the eight OFDM symbols having a subcarrier spacing of 60 kHz from the time length of the scheduling unit is disposed before or after all symbols in the scheduling unit, and no information is sent or received in the remaining 64×Ts1;
where a length of the Ts is $1/30720$ ms, and a length of the Ts1 is $1/122880$ ms.

The present application will be described below through multiple embodiments.

Embodiment 1

In this embodiment, the receiving end is, for example, a terminal, and the sending end is, for example, a base station. As shown in FIG. 4, the base station sends the data to the terminal on first five symbols in the scheduling unit. The scheduling unit uses seven OFDM symbols having a subcarrier spacing of 60 kHz, and is aligned with two NR OFDM symbols having a subcarrier spacing of 15 kHz. The two NR OFDM symbols having a subcarrier spacing of 15 kHz are the same as two LTE OFDM symbols having a subcarrier spacing of 15 kHz and having normal CPs. In this embodiment, a length of the two NR OFDM symbols having a subcarrier spacing of 15 kHz is 2×2192×Ts, Ts=$1/30720$ ms. The CP lengths of the seven OFDM symbols having a subcarrier spacing of 60 kHz respectively are: 512×Ts1, 448×Ts1, 448×Ts1, 448×Ts1, 448×Ts1, 448×Ts1, and 448×Ts1, where a length of the Ts1 is $1/122880$ ms. The symbol whose CP length is 512×Ts1 may be disposed in any one of seven positions.

In this embodiment, the terminal may receive the data on first five symbols in the scheduling unit.

Embodiment 2

Figure 5:
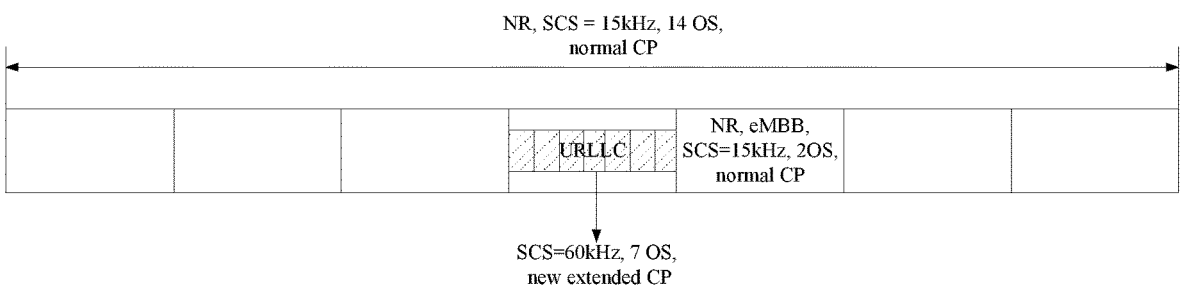
FIG. 5 is a schematic diagram illustrating that a scheduling unit is formed by seven OFDM symbols having a subcarrier spacing of 60 kHz and having new extended CPs and that OFDM symbols having a subcarrier spacing of 15 kHz and having normal CPs coexist in an embodiment of the present application.

In this embodiment, the receiving end is, for example, a base station, and the sending end is, for example, a terminal. As shown in FIG. 5, the terminal sends the data to the base station on seven symbols in the scheduling unit. The scheduling unit uses seven OFDM symbols having a subcarrier spacing of 60 kHz, and is aligned with two NR OFDM symbols having a subcarrier spacing of 15 kHz. The two NR OFDM symbols having a subcarrier spacing of 15 kHz are the same as two LTE OFDM symbols having a subcarrier spacing of 15 kHz and having normal CPs. In this embodiment, a length of the two NR OFDM symbols having a subcarrier spacing of 15 kHz is $(2192+2208) \times Ts$, $Ts=1/30720$ ms. The CP lengths of the seven OFDM symbols having a subcarrier spacing of 60 kHz respectively are: $480 \times Ts1$, $464 \times Ts1$, $464 \times Ts1$, $464 \times Ts1$, $464 \times Ts1$, $464 \times Ts1$, and $464 \times Ts1$, where a length of the Ts1 is $1/122880$ ms. The symbol whose CP length is $480 \times Ts1$ may be disposed in any one of seven positions.

In this embodiment, the base station may receive the data on seven symbols in the scheduling unit.

Embodiment 3

Figure 6:
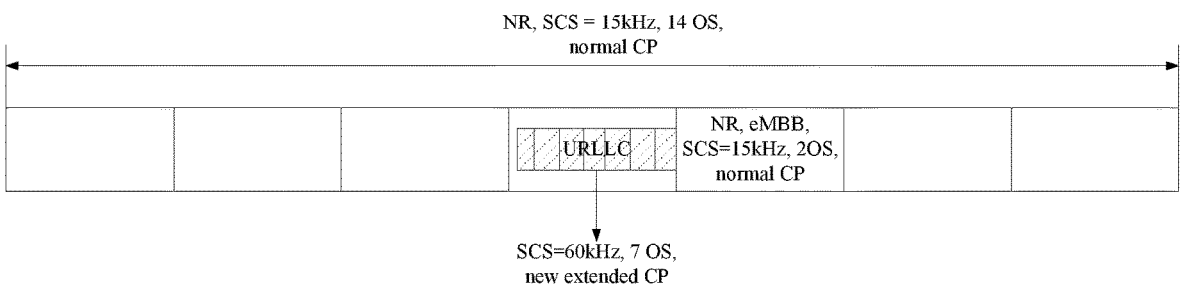
FIG. 6 is a schematic diagram illustrating that a scheduling unit is formed by a first gap and seven OFDM symbols having a subcarrier spacing of 60 kHz and having new extended CPs and that OFDM symbols having a subcarrier spacing of 15 kHz and having normal CPs coexist in an embodiment of the present application.

In this embodiment, the receiving end is, for example, a terminal, and the sending end is, for example, a base station. As shown in FIG. 6, the base station sends the data to the terminal on seven symbols in the scheduling unit. The scheduling unit uses seven OFDM symbols having a subcarrier spacing of 60 kHz as well as a first gap, and is aligned with two NR OFDM symbols having a subcarrier spacing of 15 kHz. The two NR OFDM symbols having a subcarrier spacing of 15 kHz are the same as two LTE OFDM symbols having a subcarrier spacing of 15 kHz and having normal CPs. The duration of the first gap is less than or equal to a first predetermined duration. In this embodiment, a length of the two NR OFDM symbols having a subcarrier spacing of 15 kHz is $(2192+2208) \times Ts$, $Ts=1/30720$ ms. The first predetermined duration is $128 \times Ts1$, where a length of the Ts1 is $1/122880$ ms. The CP lengths of the seven OFDM symbols having a subcarrier spacing of 60 kHz respectively are $448 \times Ts1$, $448 \times Ts1$, $448 \times Ts1$, $448 \times Ts1$, $448 \times Ts1$, $448 \times Ts1$, and $448 \times Ts1$, remaining $128 \times Ts1$ obtained by removing the length of the seven OFDM symbols having a subcarrier spacing of 60 kHz from the time length of the scheduling unit is disposed before all symbols in the scheduling unit, and no information is sent or received in the remaining $128 \times Ts1$; or the CP lengths of the seven OFDM symbols having a subcarrier spacing of 60 kHz respectively are $464 \times Ts1$, $464 \times Ts1$, $464 \times Ts1$, $464 \times Ts1$, $464 \times Ts1$, $464 \times Ts1$, and $464 \times Ts1$, remaining $16 \times Ts1$ obtained by removing the length of the seven OFDM symbols having a subcarrier spacing of 60 kHz from the time length of the scheduling unit is disposed before all symbols in the scheduling unit, no information is sent or received in the remaining $16 \times Ts1$, where a length of the Ts1 is $1/122880$ ms.

In this embodiment, the terminal may receive the data on seven symbols in the scheduling unit.

Embodiment 4

In this embodiment, the receiving end is, for example, a terminal, and the sending end is, for example, a base station.

Figure 7:
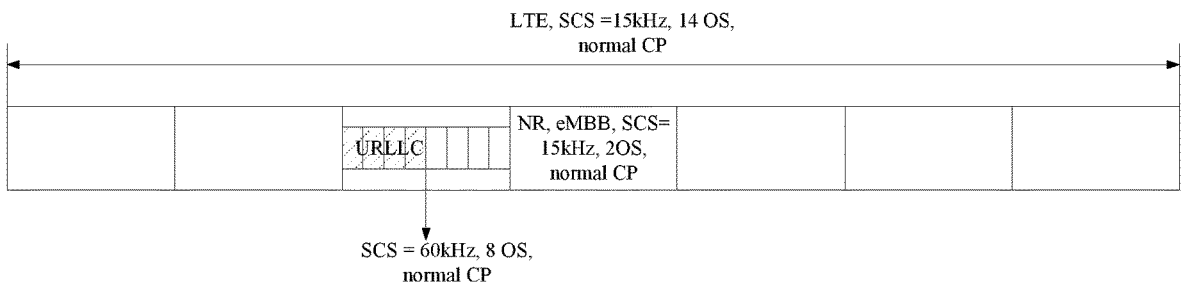
FIG. 7 is a schematic diagram one illustrating that a scheduling unit is formed by eight OFDM symbols having a subcarrier spacing of 60 kHz and having normal CPs and that OFDM symbols having a subcarrier spacing of 15 kHz and having normal CPs coexist in an embodiment of the present application.

As shown in FIG. 7, the base station sends the data to the terminal on first four symbols in the scheduling unit. The scheduling unit uses eight OFDM symbols having a subcarrier spacing of 60 kHz, and is aligned with two NR OFDM symbols having a subcarrier spacing of 15 kHz. The two NR OFDM symbols having a subcarrier spacing of 15 kHz are the same as two LTE OFDM symbols having a subcarrier spacing of 15 kHz and having normal CPs. In this embodiment, a length of the two NR OFDM symbols having a subcarrier spacing of 15 kHz is $2 \times 2192 \times Ts$, $Ts=1/30720$ ms. The CP lengths of the eight OFDM symbols having a subcarrier spacing of 60 kHz respectively are: $144 \times Ts1$, $144 \times Ts1$, $144 \times Ts1$, $144 \times Ts1$, $144 \times Ts1$, $144 \times Ts1$, $144 \times Ts1$, and $144 \times Ts1$, where a length of the Ts1 is $1/122880$ ms.

In this embodiment, the terminal may receive the data on first four symbols in the scheduling unit.

Embodiment 5

Figure 8:
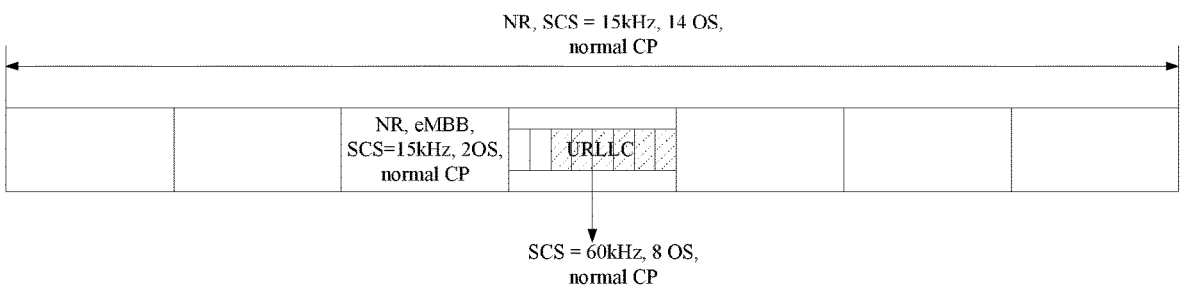
FIG. 8 is a schematic diagram two illustrating that a scheduling unit is formed by eight OFDM symbols having a subcarrier spacing of 60 kHz and having normal CPs and that OFDM symbols having a subcarrier spacing of 15 kHz and having normal CPs coexist in an embodiment of the present application.

In this embodiment, the receiving end is, for example, a base station, and the sending end is, for example, a terminal. As shown in FIG. 8, the terminal sends the data to the base station on last six symbols in the scheduling unit. The scheduling unit uses eight OFDM symbols having a subcarrier spacing of 60 kHz, and is aligned with two NR OFDM symbols having a subcarrier spacing of 15 kHz. The two NR OFDM symbols having a subcarrier spacing of 15 kHz are the same as two LTE OFDM symbols having a subcarrier spacing of 15 kHz and having normal CPs. In this embodiment, a length of the two NR OFDM symbols having a subcarrier spacing of 15 kHz is $(2192+2208) \times Ts$, $Ts=1/30720$ ms. The CP lengths of the eight OFDM symbols having a subcarrier spacing of 60 kHz respectively are: $208 \times Ts1$, $144 \times Ts1$, $144 \times Ts1$, $144 \times Ts1$, $144 \times Ts1$, $144 \times Ts1$, $144 \times Ts1$, and $144 \times Ts1$, where a length of the Ts1 is $1/122880$ ms. The symbol whose CP length is $208 \times Ts1$ may be disposed in any one of eight positions.

In this embodiment, the base station may receive the data on last six symbols in the scheduling unit.

Embodiment 6

Figure 9:
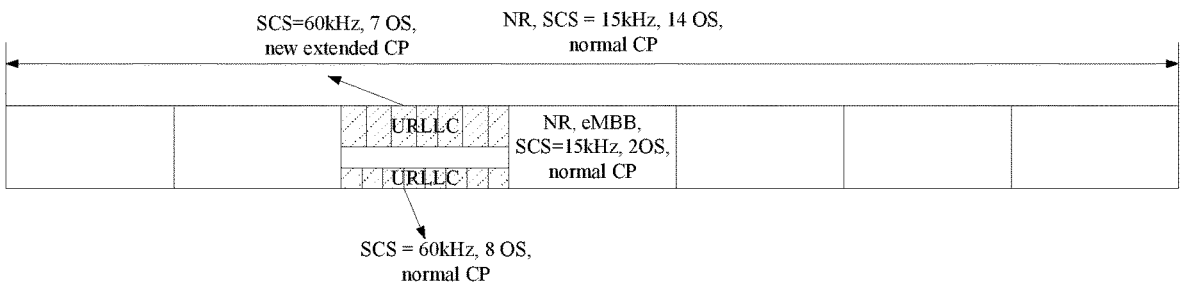
FIG. 9 is a schematic diagram illustrating that a scheduling unit formed by eight OFDM symbols having a subcarrier spacing of 60 kHz and having normal CPs is aligned with a scheduling unit formed by seven OFDM symbols having a subcarrier spacing of 60 kHz and having new extended CPs in an embodiment of the present application.

In this embodiment, the receiving end is, for example, a terminal, and the sending end is, for example, a base station. As shown in FIG. 9, in two NR OFDM symbols having a subcarrier spacing of 15 kHz, the base station sends the data to a first terminal on eight symbols in a first scheduling unit, and sends the data to a second terminal on seven symbols in a second scheduling unit. The two NR OFDM symbols having a subcarrier spacing of 15 kHz are the same as two LTE OFDM symbols having a subcarrier spacing of 15 kHz and having normal CPs. The first scheduling unit includes eight OFDM symbols having a subcarrier spacing of 60 kHz and having normal CPs. The second scheduling unit includes seven OFDM symbols having a subcarrier spacing of 60 kHz and having new extended CPs. In this embodiment, a length of the two NR OFDM symbols having a subcarrier spacing of 15 kHz is $2 \times 2192 \times Ts$, $Ts=1/30720$ ms. The CP lengths of the eight OFDM symbols having a subcarrier spacing of 60 kHz respectively are: $144 \times Ts1$, $144 \times Ts1$, $144 \times Ts1$, $144 \times Ts1$, $144 \times Ts1$, $144 \times Ts1$, $144 \times Ts1$, and $144 \times Ts1$, and the CP lengths of the seven OFDM symbols having a subcarrier spacing of 60 kHz respectively are: $512 \times Ts1$, $448 \times Ts1$, $448 \times Ts1$, $448 \times Ts1$, $448 \times Ts1$, $448 \times Ts1$, and $448 \times Ts1$, where a length of the Ts1 is $1/122880$ ms. The symbol whose CP length is $512 \times Ts1$ may be disposed in any one of seven positions.

In this embodiment, the first terminal may receive the data on eight symbols in the first scheduling unit, and the second terminal may receive the data on seven symbols in the second scheduling unit.

Embodiment 7

Figure 10:
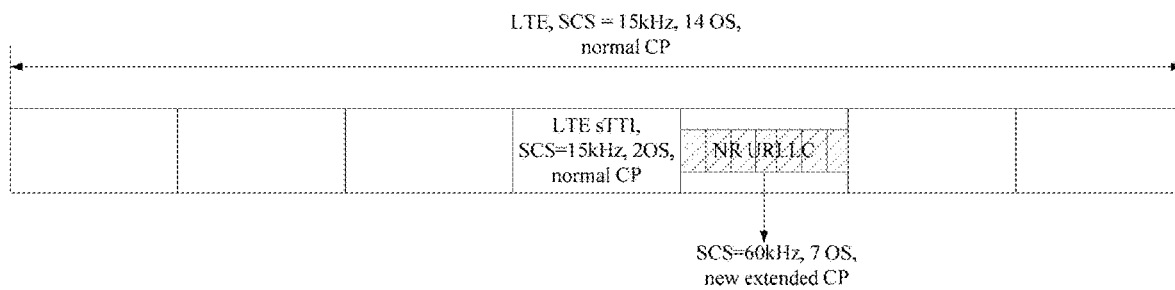
FIG. 10 is a schematic diagram illustrating that a scheduling unit is formed by seven OFDM symbols having a subcarrier spacing of 60 kHz and having new extended CPs in the NR and that the NR and the LTE coexist in an embodiment of the present application.

As shown in FIG. 10, a base station supports both LTE and NR technologies. The receiving end is, for example, a terminal, and the sending end is, for example, a base station. An LTE signal is sent in the short TTI formed by the seventh symbol and the eighth symbol. For an NR terminal supporting a subcarrier spacing of 60 kHz, the base station sends the data to the terminal on the ninth symbol and the tenth symbol among seven symbols in the scheduling unit whose length is seven OFDM symbols having a subcarrier spacing of 60 kHz. The scheduling unit is aligned with two LTE OFDM symbols having a subcarrier spacing of 15 kHz and having normal CPs, that is, the ninth symbol and the tenth symbol. In this embodiment, the length of the two LTE OFDM symbols having a subcarrier spacing of 15 kHz and having normal CPs, that is, the ninth symbol and the tenth symbol, is (2192+2208)×Ts, Ts=1/30720 ms. The CP lengths of the seven OFDM symbols having a subcarrier spacing of 60 kHz respectively are: 512×Ts1, 512×Ts1, 448×Ts1, 448×Ts1, 448×Ts1, 448×Ts1, and 448×Ts1, where a length of the Ts1 is 1/122880 ms.

Two symbols whose CP lengths are 512×Ts1 may be disposed in any two of seven positions.

Figure 11:
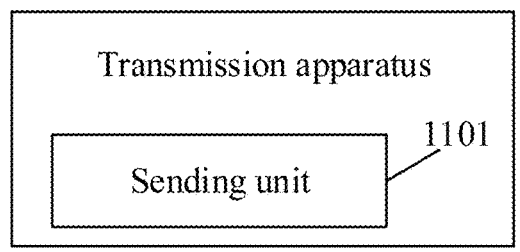
FIG. 11 is a block diagram of a transmission apparatus including a sending unit according to an embodiment of the present application.

In addition, the embodiments of the present application further provide a data transmission apparatus. As shown in FIG. 11, the apparatus includes: a sending unit, which is configured to send data to a receiving end on one or more OFDM symbols in a scheduling unit, where a time length of the scheduling unit is a length of two LTE OFDM symbols having normal CPs and a subcarrier spacing of 15 kHz, the scheduling unit is formed by seven or eight OFDM symbols having a subcarrier spacing of 60 kHz, or the scheduling unit is formed by a first gap and seven OFDM symbols having a subcarrier spacing of 60 kHz, or the scheduling unit is formed by a second gap and eight OFDM symbols having a subcarrier spacing of 60 kHz, the OFDM symbols having a subcarrier spacing of 60 kHz include CPs and valid data, two types of different CP lengths are used in the seven OFDM symbols having a subcarrier spacing of 60 kHz and the eight OFDM symbols having a subcarrier spacing of 60 kHz in the scheduling unit, a duration of the first gap is less than or equal to a first predetermined duration, and a duration of the second gap is less than or equal to a second predetermined duration.

Exemplarily, the first predetermined duration may be equal to 128×Ts1, and the second predetermined duration may be equal to 64×Ts1, where a length of the Ts1 is 1/122880 ms.

In this embodiment, in condition that the scheduling unit is formed by seven OFDM symbols having a subcarrier spacing of 60 kHz, the length of the two LTE OFDM symbols having normal CPs and a subcarrier spacing of 15 kHz is 2×2192×Ts, and configuration of CP lengths of the seven OFDM symbols having a subcarrier spacing of 60 kHz may include one of:
512×Ts1, 448×Ts1, 448×Ts1, 448×Ts1, 448×Ts1, 448×Ts1, and 448×Ts1;
480×Ts1, 480×Ts1, 448×Ts1, 448×Ts1, 448×Ts1, 448×Ts1, and 448×Ts1; and
464×Ts1, 464×Ts1, 464×Ts1, 464×Ts1, 448×Ts1, 448×Ts1, and 448×Ts1;
where a length of the Ts is 1/30720 ms, and a length of the Ts1 is 1/122880 ms.

In condition that the scheduling unit is formed by a first gap and seven OFDM symbols having a subcarrier spacing of 60 kHz, the length of the two LTE OFDM symbols having normal CPs and a subcarrier spacing of 15 kHz is 2×2192×Ts, and CP lengths of the seven OFDM symbols having a subcarrier spacing of 60 kHz respectively are:
448×Ts1, 448×Ts1, 448×Ts1, 448×Ts1, 448×Ts1, 448×Ts1, and 448×Ts1, remaining 64×Ts1 obtained by removing a length of the seven OFDM symbols having a subcarrier spacing of 60 kHz from the time length of the scheduling unit is disposed before or after all symbols in the scheduling unit, and no information is sent or received in the remaining 64×Ts1;
where a length of the Ts is 1/30720 ms, and a length of the Ts1 is 1/122880 ms.

In this embodiment, in condition that the scheduling unit is formed by seven OFDM symbols having a subcarrier spacing of 60 kHz, the length of the two LTE OFDM symbols having normal CPs and a subcarrier spacing of 15 kHz is (2192+2208)×Ts, and CP lengths of the seven OFDM symbols having a subcarrier spacing of 60 kHz may include one of:
576×Ts1, 448×Ts1, 448×Ts1, 448×Ts1, 448×Ts1, 448×Ts1, and 448×Ts1;
512×Ts1, 512×Ts1, 448×Ts1, 448×Ts1, 448×Ts1, 448×Ts1, and 448×Ts1;
480×Ts1, 480×Ts1, 480×Ts1, 480×Ts1, 448×Ts1, 448×Ts1, and 448×Ts1; and
480×Ts1, 464×Ts1, 464×Ts1, 464×Ts1, 464×Ts1, 464×Ts1, and 464×Ts1;
where a length of the Ts is 1/30720 ms, and a length of the Ts1 is 1/122880 ms.

In condition that the scheduling unit is formed by a first gap and seven OFDM symbols having a subcarrier spacing of 60 kHz, the length of the two LTE OFDM symbols having normal CPs and a subcarrier spacing of 15 kHz is (2192+2208)×Ts, and configuration of CP lengths of the seven OFDM symbols having a subcarrier spacing of 60 kHz include one of:
448×Ts1, 448×Ts1, 448×Ts1, 448×Ts1, 448×Ts1, 448×Ts1, and 448×Ts1, remaining 128×Ts1 obtained by removing a length of the seven OFDM symbols having a subcarrier spacing of 60 kHz from the time length of the scheduling unit is disposed before or after all symbols in the scheduling unit, and no information is sent or received in the remaining 128×Ts1; and
464×Ts1, 464×Ts1, 464×Ts1, 464×Ts1, 464×Ts1, 464×Ts1, and 464×Ts1, remaining 16×Ts1 obtained by removing a length of the seven OFDM symbols having a subcarrier spacing of 60 kHz from the time length of the scheduling unit is disposed before or after all symbols in the scheduling unit, and no information is sent or received in the remaining 16×Ts1;
where a length of the Ts is 1/30720 ms, and a length of the Ts1 is 1/122880 ms.

In this embodiment, in condition that the scheduling unit is formed by eight OFDM symbols having a subcarrier spacing of 60 kHz, the length of the two LTE OFDM symbols having normal CPs and a subcarrier spacing of 15 kHz is 2×2192×Ts, and CP lengths of the eight OFDM symbols having a subcarrier spacing of 60 kHz respectively are: 144×Ts1, 144×Ts1, 144×Ts1, 144×Ts1, 144×Ts1, 144×Ts1, 144×Ts1, and 144×Ts1, where a length of the Ts is 1/30720 ms, and a length of the Ts1 is 1/122880 ms.

In this embodiment, in condition that the scheduling unit is formed by eight OFDM symbols having a subcarrier spacing of 60 kHz, the length of the two LTE OFDM symbols having normal CPs and a subcarrier spacing of 15 kHz is (2192+2208)×Ts, and configuration of CP lengths of the eight OFDM symbols having a subcarrier spacing of 60 kHz may include one of:
160×Ts1, 160×Ts1, 160×Ts1, 160×Ts1, 144×Ts1, 144×Ts1, 144×Ts1, and 144×Ts1; and
208×Ts1, 144×Ts1, 144×Ts1, 144×Ts1, 144×Ts1, 144×Ts1, 144×Ts1, and 144×Ts1;
where a length of the Ts is $1/30720$ ms, and a length of the Ts1 is $1/122880$ ms.

In condition that the scheduling unit is formed by a second gap and eight OFDM symbols having a subcarrier spacing of 60 kHz, the length of the two LTE OFDM symbols having normal CPs and a subcarrier spacing of 15 kHz is (2192+2208)×Ts, and CP lengths of the eight OFDM symbols having a subcarrier spacing of 60 kHz respectively are:
144×Ts1, 144×Ts1, 144×Ts1, 144×Ts1, 144×Ts1, 144×Ts1, 144×Ts1, and 144×Ts1, remaining 64×Ts1 obtained by removing a length of the eight OFDM symbols having a subcarrier spacing of 60 kHz from the time length of the scheduling unit is disposed before or after all symbols in the scheduling unit, and no information is sent or received in the remaining 64×Ts1;
where a length of the Ts is $1/30720$ ms, and a length of the Ts1 is $1/122880$ ms.

Figure 12:
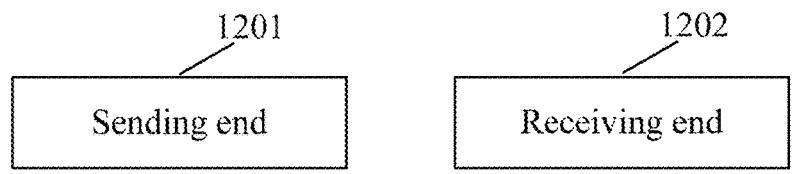
FIG. 12 is a block diagram of a transmission apparatus including a receiving unit according to an embodiment of the present application.

The embodiments of the present application further provide a data transmission apparatus. As shown in FIG. 12, the apparatus includes: a receiving unit, which is configured to receive data sent by a sending end on one or more OFDM symbols in a scheduling unit, where a time length of the scheduling unit is a length of two LTE OFDM symbols having normal CPs, the scheduling unit is formed by seven or eight OFDM symbols having a subcarrier spacing of 60 kHz, or the scheduling unit is formed by a first gap and seven OFDM symbols having a subcarrier spacing of 60 kHz, or the scheduling unit is formed by a second gap and eight OFDM symbols having a subcarrier spacing of 60 kHz, the OFDM symbols having a subcarrier spacing of 60 kHz include CPs and valid data, two types of different CP lengths are used in the seven OFDM symbols having a subcarrier spacing of 60 kHz and the eight OFDM symbols having a subcarrier spacing of 60 kHz in the scheduling unit, a duration of the first gap is less than or equal to a first predetermined duration, and a duration of the second gap is less than or equal to a second predetermined duration.

Exemplarily, the first predetermined duration may be equal to 128×Ts1, and the second predetermined duration may be equal to 64×Ts1, where a length of the Ts1 is $1/122880$ ms. In this embodiment, in condition that the scheduling unit is formed by seven OFDM symbols having a subcarrier spacing of 60 kHz, the length of the two LTE OFDM symbols having normal CPs and a subcarrier spacing of 15 kHz is 2×2192×Ts, and configuration of CP lengths of the seven OFDM symbols having a subcarrier spacing of 60 kHz may include one of:
512×Ts1, 448×Ts1, 448×Ts1, 448×Ts1, 448×Ts1, 448×Ts1, and 448×Ts1;
480×Ts1, 480×Ts1, 448×Ts1, 448×Ts1, 448×Ts1, 448×Ts1, and 448×Ts1; and
464×Ts1, 464×Ts1, 464×Ts1, 464×Ts1, 448×Ts1, 448×Ts1, and 448×Ts1;
where a length of the Ts is $1/30720$ ms, and a length of the Ts1 is $1/122880$ ms.

In condition that the scheduling unit is formed by a first gap and seven OFDM symbols having a subcarrier spacing of 60 kHz, the length of the two LTE OFDM symbols having normal CPs and a subcarrier spacing of 15 kHz is 2×2192×Ts, and CP lengths of the seven OFDM symbols having a subcarrier spacing of 60 kHz respectively are:
448×Ts1, 448×Ts1, 448×Ts1, 448×Ts1, 448×Ts1, 448×Ts1, and 448×Ts1, remaining 64×Ts1 obtained by removing a length of the seven OFDM symbols having a subcarrier spacing of 60 kHz from the time length of the scheduling unit is disposed before or after all symbols in the scheduling unit, and no information is sent or received in the remaining 64×Ts1;
where a length of the Ts is $1/30720$ ms, and a length of the Ts1 is $1/122880$ ms.

In this embodiment, in condition that the scheduling unit is formed by seven OFDM symbols having a subcarrier spacing of 60 kHz, the length of the two LTE OFDM symbols having normal CPs and a subcarrier spacing of 15 kHz is (2192+2208)×Ts, and configuration of CP lengths of the seven OFDM symbols having a subcarrier spacing of 60 kHz may include one of:
576×Ts1, 448×Ts1, 448×Ts1, 448×Ts1, 448×Ts1, 448×Ts1, and 448×Ts1;
512×Ts1, 512×Ts1, 448×Ts1, 448×Ts1, 448×Ts1, 448×Ts1, and 448×Ts1;
480×Ts1, 480×Ts1, 480×Ts1, 480×Ts1, 448×Ts1, 448×Ts1, and 448×Ts1; and
480×Ts1, 464×Ts1, 464×Ts1, 464×Ts1, 464×Ts1, 464×Ts1, and 464×Ts1;
where a length of the Ts is $1/30720$ ms, and a length of the Ts1 is $1/122880$ ms.

In condition that the scheduling unit is formed by a first gap and seven OFDM symbols having a subcarrier spacing of 60 kHz, the length of the two LTE OFDM symbols having normal CPs and a subcarrier spacing of 15 kHz is (2192+2208)×Ts, and configuration of CP lengths of the seven OFDM symbols having a subcarrier spacing of 60 kHz includes one of:
448×Ts1, 448×Ts1, 448×Ts1, 448×Ts1, 448×Ts1, 448×Ts1, and 448×Ts1, remaining 128×Ts1 obtained by removing a length of the seven OFDM symbols having a subcarrier spacing of 60 kHz from the time length of the scheduling unit is disposed before or after all symbols in the scheduling unit, and no information is sent or received in the remaining 128×Ts1; and
464×Ts1, 464×Ts1, 464×Ts1, 464×Ts1, 464×Ts1, 464×Ts1, and 464×Ts1, remaining 16×Ts1 obtained by removing a length of the seven OFDM symbols having a subcarrier spacing of 60 kHz from the time length of the scheduling unit is disposed before or after all symbols in the scheduling unit, and no information is sent or received in the remaining 16×Ts1;
where a length of the Ts is $1/30720$ ms, and a length of the Ts1 is $1/122880$ ms.

In this embodiment, in condition that the scheduling unit is formed by eight OFDM symbols having a subcarrier spacing of 60 kHz, the length of the two LTE OFDM symbols having normal CPs and a subcarrier spacing of 15 kHz is 2×2192×Ts, and CP lengths of the eight OFDM symbols having a subcarrier spacing of 60 kHz respectively are: 144×Ts1, 144×Ts1, 144×Ts1, 144×Ts1, 144×Ts1, 144×Ts1, 144×Ts1, and 144×Ts1, where a length of the Ts is $1/30720$ ms, and a length of the Ts1 is $1/122880$ ms.

In this embodiment, in condition that the scheduling unit is formed by eight OFDM symbols having a subcarrier spacing of 60 kHz, the length of the two LTE OFDM symbols having normal CPs and a subcarrier spacing of 15 kHz is (2192+2208)×Ts, and configuration of CP lengths of the eight OFDM symbols having a subcarrier spacing of 60 kHz may include one of:

160×Ts1, 160×Ts1, 160×Ts1, 160×Ts1, 144×Ts1, 144×Ts1, 144×Ts1, and 144×Ts1; and

208×Ts1, 144×Ts1, 144×Ts1, 144×Ts1, 144×Ts1, 144×Ts1, 144×Ts1, and 144×Ts1;

where a length of the Ts is 1/30720 ms, and a length of the Ts1 is 1/122880 ms.

In condition that the scheduling unit is formed by a second gap and eight OFDM symbols having a subcarrier spacing of 60 kHz, the length of the two LTE OFDM symbols having normal CPs and a subcarrier spacing of 15 kHz is (2192+2208)×Ts, and CP lengths of the eight OFDM symbols having a subcarrier spacing of 60 kHz respectively are:

144×Ts1, 144×Ts1, 144×Ts1, 144×Ts1, 144×Ts1, 144×Ts1, 144×Ts1, and 144×Ts1, remaining 64×Ts1 obtained by removing a length of the eight OFDM symbols having a subcarrier spacing of 60 kHz from the time length of the scheduling unit is disposed before or after all symbols in the scheduling unit, and no information is sent or received in the remaining 64×Ts1;

where a length of the Ts is 1/30720 ms, and a length of the Ts1 is 1/122880 ms.

The embodiments of the present application further provide an electronic device. The electronic device includes a processor and a memory storing processor-executable instructions which, when executed by the processor, execute following operations:

sending data to a receiving end on one or more OFDM symbols in a scheduling unit, where a time length of the scheduling unit is a length of two LTE OFDM symbols having normal CPs, the scheduling unit is formed by seven or eight OFDM symbols having a subcarrier spacing of 60 kHz, or the scheduling unit is formed by a first gap and seven OFDM symbols having a subcarrier spacing of 60 kHz, or the scheduling unit is formed by a second gap and eight OFDM symbols having a subcarrier spacing of 60 kHz, the OFDM symbols having a subcarrier spacing of 60 kHz include CPs and valid data, two types of different CP lengths are used in the seven OFDM symbols having a subcarrier spacing of 60 kHz and the eight OFDM symbols having a subcarrier spacing of 60 kHz in the scheduling unit, a duration of the first gap is less than or equal to a first predetermined duration, and a duration of the second gap is less than or equal to a second predetermined duration.

Exemplarily, the first predetermined duration may be equal to 128×Ts1, and the second predetermined duration may be equal to 64×Ts1, where a length of the Ts1 is 1/122880 ms. The embodiments of the present application further provide an electronic device. The electronic device includes a processor and a memory storing processor-executable instructions which, when executed by the processor, execute following operations:

receiving data sent by a sending end on one or more OFDM symbols in a scheduling unit, where a time length of the scheduling unit is a length of two LTE OFDM symbols having normal CPs and a subcarrier spacing of 15 kHz, the scheduling unit is formed by seven or eight OFDM symbols having a subcarrier spacing of 60 kHz, or the scheduling unit is formed by a first gap and seven OFDM symbols having a subcarrier spacing of 60 kHz formed by a first gap and seven OFDM symbols having a subcarrier spacing of 60 kHz, or the scheduling unit is formed by a second gap and eight OFDM symbols having a subcarrier spacing of 60 kHz, the OFDM symbols having a subcarrier spacing of 60 kHz include CPs and valid data, two types of different CP lengths are used in the seven OFDM symbols having a subcarrier spacing of 60 kHz and the eight OFDM symbols having a subcarrier spacing of 60 kHz in the scheduling unit, a duration of the first gap is less than or equal to a first predetermined duration, and a duration of the second gap is less than or equal to a second predetermined duration.

Exemplarily, the first predetermined duration may be equal to 128×Ts1, and the second predetermined duration may be equal to 64×Ts1, where a length of the Ts1 is 1/122880 ms.

In addition, the embodiments of the present application further provide a computer-readable storage medium configured to store computer-executable instructions for executing the data transmission method applied to a sending end when executed by a processor.

In addition, the embodiments of the present application further provide a computer-readable storage medium configured to store computer-executable instructions for executing the data transmission method applied to a receiving end when executed by a processor.

It should be understood by those skilled in the art that functional modules or units in all or part of the steps of the method, the system and the apparatus disclosed above may be implemented as software, firmware, hardware and appropriate combinations thereof. In the hardware implementation, the division of functional modules or units mentioned in the above description may not correspond to the division of physical components. For example, one physical component may have multiple functions, or one function or step may be executed jointly by several physical components. Some or all components may be implemented as software executed by processors such as digital signal processors or microcontrollers, hardware, or integrated circuits such as application specific integrated circuits. Such software may be distributed on a computer-readable medium, which may include a computer storage medium (or a non-transitory medium) and a communication medium (or a transitory medium). As is known to those skilled in the art, the term, computer storage medium, includes volatile and nonvolatile, removable and non-removable media implemented in any method or technology for storing information (such as computer-readable instructions, data structures, program modules or other data). The computer storage medium includes, but is not limited to, a random access memory (RAM), a read-only memory (ROM), an electrically erasable programmable read-only memory (EEPROM), a flash memory or other memory technologies, a compact disc-read only memory (CD-ROM), a digital versatile disc (DVD) or other optical disc storage, a magnetic cassette, a magnetic tape, a magnetic disk storage or other magnetic storage apparatuses, or any other medium used for storing desired information and accessed by a computer. In addition, as is known to those skilled in the art, the communication medium generally includes computer-readable instructions, data structures, program modules or other data in modulated data signals such as carriers or other transmission mechanisms, and may include any information delivery medium.

Although the embodiments disclosed by the present application are as described above, the content thereof is merely embodiments for facilitating the understanding of the present application and is not intended to limit the present application. Any person skilled in the art to which the present application pertains may make any modifications and variations in the implementation forms and details without departing from the spirit and scope disclosed by the present application, but the patent protection scope of the present application is still subject to the scope defined by the appended claims.

What is claimed is:

1. A data transmission method, comprising:
sending, by a sending end, data to a receiving end on one or more orthogonal frequency division multiplexing (OFDM) symbols in a scheduling unit, wherein a time length of the scheduling unit is a length of two long term evolution (LTE) OFDM symbols having normal cycle prefixes and a subcarrier spacing of 15 kilohertz (kHz), the scheduling unit is formed by seven or eight OFDM symbols having a subcarrier spacing of 60 kHz, or the scheduling unit is formed by a first gap and seven OFDM symbols having a subcarrier spacing of 60 kHz, or the scheduling unit is formed by a second gap and a second gap and eight OFDM symbols having a subcarrier spacing of 60 kHz, the OFDM symbols having the subcarrier spacing of 60 kHz comprise cycle prefixes and valid data, two types of different cycle prefix lengths are used in the seven OFDM symbols having the subcarrier spacing of 60 kHz and the eight OFDM symbols having the subcarrier spacing of 60 kHz in the scheduling unit, wherein a duration of the first gap is less than or equal to a first predetermined duration, and a duration of the second gap is less than or equal to a second predetermined duration.

2. The data transmission method of claim 1, wherein in condition that the scheduling unit is formed by the seven OFDM symbols having the subcarrier spacing of 60 kHz, the length of the two LTE OFDM symbols having the normal cycle prefixes and the subcarrier spacing of 15 kHz is 2×2192×Ts, and configuration of cycle prefix lengths of the seven OFDM symbols having the subcarrier spacing of 60 kHz comprises one of:
512×Ts1, 448×Ts1, 448×Ts1, 448×Ts1, 448×Ts1, 448×Ts1, and 448×Ts1;
480×Ts1, 480×Ts1, 448×Ts1, 448×Ts1, 448×Ts1, 448×Ts1, and 448×Ts1; and
464×Ts1, 464×Ts1, 464×Ts1, 464×Ts1, 448×Ts1, 448×Ts1, and 448×Ts1;
wherein Ts is a time length of 1/30720 millisecond (ms), and Ts1 is a time length of 1/122880 ms.

3. The data transmission method of claim 1, wherein in condition that the scheduling unit is formed by the first gap and the seven OFDM symbols having the subcarrier spacing of 60 kHz, the length of the two LTE OFDM symbols having the normal cycle prefixes and the subcarrier spacing of 15 kHz is 2×2192×Ts, and cycle prefix lengths of the seven OFDM symbols having the subcarrier spacing of 60 kHz respectively are:
448×Ts1, 448×Ts1, 448×Ts1, 448×Ts1, 448×Ts1, 448×Ts1, and 448×Ts1, wherein remaining 64×Ts1 obtained by removing a length of the seven OFDM symbols having the subcarrier spacing of 60 kHz from the time length of the scheduling unit is disposed before or after all symbols in the scheduling unit, and no information is sent or received in the remaining 64×Ts1;
wherein Ts is a time length of 1/30720 ms, and Ts1 is a time length of 1/122880 ms.

4. The data transmission method of claim 1, wherein in condition that the scheduling unit is formed by the seven OFDM symbols having the subcarrier spacing of 60 kHz, the length of the two LTE OFDM symbols having the normal cycle prefixes and the subcarrier spacing of 15 kHz is (2192+2208)×Ts, and configuration of cycle prefix lengths of the seven OFDM symbols having the subcarrier spacing of 60 kHz comprise one of:
576×Ts1, 448×Ts1, 448×Ts1, 448×Ts1, 448×Ts1, 448×Ts1, and 448×Ts1;
512×Ts1, 512×Ts1, 448×Ts1, 448×Ts1, 448×Ts1, 448×Ts1, and 448×Ts1;
480×Ts1, 480×Ts1, 480×Ts1, 480×Ts1, 448×Ts1, 448×Ts1, and 448×Ts1; and
480×Ts1, 464×Ts1, 464×Ts1, 464×Ts1, 464×Ts1, 464×Ts1, and 464×Ts1;
wherein Ts is a time length of 1/30720 ms, and Ts1 is a time length of 1/122880 ms.

5. The data transmission method of claim 1, wherein in condition that the scheduling unit is formed by a first gap and the seven OFDM symbols having the subcarrier spacing of 60 kHz, the length of the two LTE OFDM symbols having the normal cycle prefixes and the subcarrier spacing of 15 kHz is (2192+2208)×Ts, and configuration of cycle prefix lengths of the seven OFDM symbols having the subcarrier spacing of 60 kHz comprises one of:
448×Ts1, 448×Ts1, 448×Ts1, 448×Ts1, 448×Ts1, 448×Ts1, and 448×Ts1, wherein remaining 128×Ts1 obtained by removing a length of the seven OFDM symbols having the subcarrier spacing of 60 kHz from the time length of the scheduling unit is disposed before or after all symbols in the scheduling unit, and no information is sent or received in the remaining 128×Ts1; and
464×Ts1, 464×Ts1, 464×Ts1, 464×Ts1, 464×Ts1, 464×Ts1, and 464×Ts1, wherein remaining 16×Ts1 obtained by removing a length of the seven OFDM symbols having the subcarrier spacing of 60 kHz from the time length of the scheduling unit is disposed before or after all symbols in the scheduling unit, and no information is sent or received in the remaining 16×Ts1;
wherein Ts is a time length of 1/30720 ms, and Ts1 is a time length of 1/122880 ms.

6. The data transmission method of claim 1, wherein in condition that the scheduling unit is formed by the eight OFDM symbols having the subcarrier spacing of 60 kHz, the length of the two LTE OFDM symbols having the normal cycle prefixes and the subcarrier spacing of 15 kHz is 2×2192×Ts, and cycle prefix lengths of the eight OFDM symbols having the subcarrier spacing of 60 kHz respectively are: 144×Ts1, 144×Ts1, 144×Ts1, 144×Ts1, 144×Ts1, 144×Ts1, 144×Ts1, and 144×Ts1, wherein Ts is a time length of 1/30720 ms, and Ts1 is a time length of 1/122880 ms.

7. The data transmission method of claim 1, wherein in condition that the scheduling unit is formed by the eight OFDM symbols having the subcarrier spacing of 60 kHz, the length of the two LTE OFDM symbols having the normal cycle prefixes and the subcarrier spacing of 15 kHz is (2192+2208)×Ts, and configuration of cycle prefix lengths of the eight OFDM symbols having the subcarrier spacing of 60 kHz comprise one of:
160×Ts1, 160×Ts1, 160×Ts1, 160×Ts1, 144×Ts1, 144×Ts1, 144×Ts1, and 144×Ts1; and
208×Ts1, 144×Ts1, 144×Ts1, 144×Ts1, 144×Ts1, 144×Ts1, 144×Ts1, and 144×Ts1;
wherein Ts is a time length of 1/30720 ms, and Ts1 is a time length of 1/122880 ms.

8. The data transmission method of claim 1, wherein in condition that the scheduling unit is formed by the second gap and the eight OFDM symbols having the subcarrier spacing of 60 kHz, the length of the two 15 kHz LTE OFDM symbols having normal cycle prefixes and the subcarrier spacing of 15 kHz is (2192+2208)×Ts, and cycle prefix lengths of the eight OFDM symbols having the subcarrier spacing of 60 kHz respectively are:

144×Ts1, 144×Ts1, 144×Ts1, 144×Ts1, 144×Ts1, 144×Ts1, 144×Ts1, and 144×Ts1, wherein remaining 64×Ts1 obtained by removing a length of the eight OFDM symbols having a subcarrier spacing of 60 kHz from the time length of in the scheduling unit is disposed before or after all symbols in the scheduling unit, and no information is sent or received in the remaining 64×Ts1;

wherein Ts is a time length of 1/30720 ms, and Ts1 is a time length of 1/122880 ms.

9. The data transmission method of claim 1, wherein the first predetermined duration is equal to 128×Ts1, and the second predetermined duration is equal to 64×Ts1, wherein Ts1 is a time length of 1/122880 ms.

10. A data reception method, comprising:

receiving, by a receiving end, data sent by a sending end on one or more orthogonal frequency division multiplexing (OFDM) symbols in a scheduling unit, wherein a time length of the scheduling unit is a length of two long term evolution (LTE) OFDM symbols having normal cycle prefixes and a subcarrier spacing of 15 kilohertz (kHz), the scheduling unit is formed by seven or eight OFDM symbols having a subcarrier spacing of 60 kHz, or the scheduling unit is formed by a first gap and seven OFDM symbols having a subcarrier spacing of 60 kHz, or the scheduling unit is formed by a second gap and a second gap and eight OFDM symbols having a subcarrier spacing of 60 kHz, the OFDM symbols having the subcarrier spacing of 60 kHz comprise cycle prefixes and valid data, two types of different cycle prefix lengths are used in the seven OFDM symbols having the subcarrier spacing of 60 kHz and the eight OFDM symbols having the subcarrier spacing of 60 kHz in the scheduling unit, wherein a duration of the first gap is less than or equal to a first predetermined duration, and a duration of the second gap is less than or equal to a second predetermined duration.

11. The method of claim 10, wherein in condition that the scheduling unit is formed by the seven OFDM symbols having the subcarrier spacing of 60 kHz, the length of the two LTE OFDM symbols having the normal cycle prefixes and the subcarrier spacing of 15 kHz is 2×2192×Ts, and configuration of cycle prefix lengths of the seven OFDM symbols having the subcarrier spacing of 60 kHz comprises one of:

512×Ts1, 448×Ts1, 448×Ts1, 448×Ts1, 448×Ts1, 448×Ts1, and 448×Ts1;
480×Ts1, 480×Ts1, 448×Ts1, 448×Ts1, 448×Ts1, 448×Ts1, and 448×Ts1; and
464×Ts1, 464×Ts1, 464×Ts1, 464×Ts1, 448×Ts1, 448×Ts1, and 448×Ts1;

wherein Ts is a time length of 1/30720 millisecond (ms), and Ts1 is a time length of 1/122880 ms.

12. The method of claim 10, wherein in condition that the scheduling unit is formed by the first gap and the seven OFDM symbols having the subcarrier spacing of 60 kHz, the length of the two LTE OFDM symbols having the normal cycle prefixes and the subcarrier spacing of 15 kHz is 2×2192×Ts, and cycle prefix lengths of the seven OFDM symbols having the subcarrier spacing of 60 kHz respectively are:

448×Ts1, 448×Ts1, 448×Ts1, 448×Ts1, 448×Ts1, 448×Ts1, and 448×Ts1, wherein, remaining 64×Ts1 obtained by removing a length of the seven OFDM symbols having the subcarrier spacing of 60 kHz from the time length of the scheduling unit is disposed before or after all symbols in the scheduling unit, and no information is sent or received in the remaining 64×Ts1;

wherein Ts is a time length of 1/30720 ms, and Ts1 is a time length of 1/122880 ms.

13. The method of claim 10, wherein in condition that the scheduling unit is formed by the seven OFDM symbols having the subcarrier spacing of 60 kHz, the length of two LTE OFDM symbols having the normal cycle prefixes and the subcarrier spacing of 15 kHz is (2192+2208)×Ts, and configuration of cycle prefix lengths of the seven OFDM symbols having a subcarrier spacing of 60 kHz comprises one of:

576×Ts1, 448×Ts1, 448×Ts1, 448×Ts1, 448×Ts1, 448×Ts1, and 448×Ts1;
512×Ts1, 512×Ts1, 448×Ts1, 448×Ts1, 448×Ts1, 448×Ts1, and 448×Ts1;
480×Ts1, 480×Ts1, 480×Ts1, 480×Ts1, 448×Ts1, 448×Ts1, and 448×Ts1; and
480×Ts1, 464×Ts1, 464×Ts1, 464×Ts1, 464×Ts1, 464×Ts1, and 464×Ts1;

wherein Ts is a time length of 1/30720 ms, and Ts1 is a time length of 1/122880 ms.

14. The method of claim 10, wherein in condition that the scheduling unit is formed by the first gap and the seven OFDM symbols having the subcarrier spacing of 60 kHz, the length of the two LTE OFDM symbols having the normal cycle prefixes and the subcarrier spacing of 15 kHz is (2192+2208)×Ts, and configuration of cycle prefix lengths of the seven OFDM symbols having a subcarrier spacing of 60 kHz comprises one of:

448×Ts1, 448×Ts1, 448×Ts1, 448×Ts1, 448×Ts1, 448×Ts1, and 448×Ts1, wherein remaining 128×Ts1 obtained by removing a length of the seven OFDM symbols having the subcarrier spacing of 60 kHz from the time length of the scheduling unit is disposed before or after all symbols in the scheduling unit, and no information is sent or received in the remaining 128×Ts1; and
464×Ts1, 464×Ts1, 464×Ts1, 464×Ts1, 464×Ts1, 464×Ts1, and 464×Ts1, wherein remaining 16×Ts1 obtained by removing a length of the seven OFDM symbols having the subcarrier spacing of 60 kHz from the time length of the scheduling unit is disposed before or after all symbols in the scheduling unit, and no information is sent or received in the remaining 16×Ts1;

wherein Ts is a time length of 1/30720 ms, and Ts1 is a time length of 1/122880 ms.

15. The method of claim 10, wherein in condition that the scheduling unit is formed by eight OFDM symbols having a subcarrier spacing of 60 kHz, the length of the two LTE OFDM symbols having the normal cycle prefixes and the subcarrier spacing of 15 kHz is 2×2192×Ts, and cycle prefix lengths of the eight OFDM symbols having the subcarrier spacing of 60 kHz respectively are: 144×Ts1, 144×Ts1, 144×Ts1, 144×Ts1, 144×Ts1, 144×Ts1, 144×Ts1, and 144×Ts1, wherein Ts is a time length of 1/30720 ms, and Ts1 is a time length of 1/122880 ms.

16. The method of claim 10, wherein in condition that the scheduling unit is formed by the eight OFDM symbols having the subcarrier spacing of 60 kHz, the length of the two LTE OFDM symbols having the normal cycle prefixes and the subcarrier spacing of 15 kHz is (2192+2208)×Ts, and configuration of cycle prefix lengths of the eight OFDM symbols having the subcarrier spacing of 60 kHz comprises one of:

160×Ts1, 160×Ts1, 160×Ts1, 160×Ts1, 144×Ts1, 144×Ts1, 144×Ts1, and 144×Ts1; and

208×Ts1, 144×Ts1, 144×Ts1, 144×Ts1, 144×Ts1, 144×Ts1, 144×Ts1, and 144×Ts1;

wherein Ts is a time length of 1/30720 ms, and Ts1 is a time length of 1/122880 ms.

17. The method of claim 10, wherein in condition that the scheduling unit is formed by the second gap and the eight OFDM symbols having the subcarrier spacing of 60 kHz, the length of the two LTE OFDM symbols having the normal cycle prefixes and the subcarrier spacing of 15 kHz is (2192+2208)×Ts, and cycle prefix lengths of the eight OFDM symbols having the subcarrier spacing of 60 kHz respectively are:

144×Ts1, 144×Ts1, 144×Ts1, 144×Ts1, 144×Ts1, 144×Ts1, 144×Ts1, and 144×Ts1, wherein remaining 64×Ts1 obtained by removing a length of the eight OFDM symbols having the subcarrier spacing of 60 kHz from the time length of the scheduling unit is disposed before or after all symbols in the scheduling unit, and no information is sent or received in the remaining 64×Ts1;

wherein Ts is a time length of 1/30720 ms, and Ts1 is a time length of 1/122880 ms.

18. The method of claim 10, wherein the first predetermined duration is equal to 128×Ts1, and the second predetermined duration is equal to 64×Ts1, wherein Ts1 is a time length of 1/122880 ms.

19. A data transmission apparatus, comprising:
a sending unit, which is configured to send data to a receiving end on one or more orthogonal frequency division multiplexing (OFDM) symbols in a scheduling unit, wherein a time length of the scheduling unit is a length of two long term evolution (LTE) OFDM symbols having normal cycle prefixes and a subcarrier spacing of 15 kilohertz (kHz), the scheduling unit is formed by seven or eight OFDM symbols having a subcarrier spacing of 60 kHz, or the scheduling unit is formed by a first gap and seven OFDM symbols having a subcarrier spacing of 60 kHz, or the scheduling unit is formed by a second gap and eight OFDM symbols having a subcarrier spacing of 60 kHz, the OFDM symbols having the subcarrier spacing of 60 kHz comprise cycle prefixes and valid data, two types of different cycle prefix lengths are used in the seven OFDM symbols having the subcarrier spacing of 60 kHz and the eight OFDM symbols having the subcarrier spacing of 60 kHz in the scheduling unit, a duration of the first gap is less than or equal to a first predetermined duration, and a duration of the second gap is less than or equal to a second predetermined duration.

20. The data transmission apparatus of claim 19, wherein the first predetermined duration is equal to 128×Ts1, and the second predetermined duration is equal to 64×Ts1, wherein Ts1 is a time length of 1/122880 millisecond (ms).

* * * * *